(12) United States Patent
Tong et al.

(10) Patent No.: US 11,086,904 B2
(45) Date of Patent: Aug. 10, 2021

(54) DATA QUERY METHOD AND APPARATUS

(71) Applicant: Huawei Technologies Co., Ltd., Guangdong (CN)

(72) Inventors: Qiang Tong, Beijing (CN); Jian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 817 days.

(21) Appl. No.: 15/677,952

(22) Filed: Aug. 15, 2017

(65) Prior Publication Data

US 2018/0011915 A1 Jan. 11, 2018

Related U.S. Application Data

(63) Continuation of application No. PCT/CN2015/098946, filed on Dec. 25, 2015.

(30) Foreign Application Priority Data

Feb. 16, 2015 (CN) .......................... 201510085627.6

(51) Int. Cl.
*G06F 16/30* (2019.01)
*G06F 16/27* (2019.01)
*G06F 16/2455* (2019.01)

(52) U.S. Cl.
CPC ...... *G06F 16/278* (2019.01); *G06F 16/24554* (2019.01); *G06F 16/24557* (2019.01)

(58) Field of Classification Search
CPC ......... G06F 16/24554; G06F 16/24557; G06F 16/278
See application file for complete search history.

(56) References Cited

U.S. PATENT DOCUMENTS

| 5,049,881 A | * | 9/1991 | Gibson | ............... H03M 7/3086 |
| | | | | 341/51 |
| 8,943,040 B1 | | 1/2015 | Shatdal et al. | |
| 9,002,859 B1 | * | 4/2015 | Ward | .................. G06F 16/2246 |
| | | | | 707/754 |
| 2002/0194157 A1 | * | 12/2002 | Zait | ................... G06F 16/24557 |

(Continued)

FOREIGN PATENT DOCUMENTS

| CN | 102063490 A | 5/2011 |
| CN | 102609433 A | 7/2012 |

(Continued)

OTHER PUBLICATIONS

EPO Summons to attend oral proceedings pursuant to Rule 115(1) EPC issued in European Application No. 15882480.5 on Jan. 14, 2021, 12 pages.

*Primary Examiner* — Mahesh H Dwivedi
(74) *Attorney, Agent, or Firm* — Fish & Richardson P.C.

(57) ABSTRACT

Embodiments of the present disclosure provide a data query method and apparatus, which implement a technical effect that data meeting a precision requirement is queried according to a user's requirement of for data precision. The method includes: receiving a query instruction that includes a query condition and query precision; determining a data partition that meets the query condition; determining a data sub-partition corresponding to the query precision from the data partition; and querying data in the data sub-partition to obtain a query result.

19 Claims, 4 Drawing Sheets

(56) References Cited

U.S. PATENT DOCUMENTS

| | | | |
|---|---|---|---|
| 2004/0125124 A1* | 7/2004 | Kim | G06F 16/71 |
| | | | 715/716 |
| 2008/0077570 A1* | 3/2008 | Tang | G06F 16/3346 |
| 2012/0179714 A1 | 7/2012 | Chandhok et al. | |
| 2014/0074614 A1* | 3/2014 | Mehanian | G06Q 30/0201 |
| | | | 705/14.64 |
| 2014/0172869 A1 | 6/2014 | Wang et al. | |
| 2014/0172870 A1 | 6/2014 | Wang et al. | |

FOREIGN PATENT DOCUMENTS

| | | |
|---|---|---|
| CN | 103064890 A | 4/2013 |
| CN | 103544258 A | 1/2014 |
| CN | 104679858 A | 6/2015 |

\* cited by examiner

| Time | Raw data | Low-precision sub-partition | High-precision sub-partition |
|---|---|---|---|
| 2010-9-1 08:00:00 | 26.1 | 26.1 | 0 |
| 2010-9-1 08:00:02 | 26.3 | 28.1 | 0.2 |
| 2010-9-1 08:00:04 | 26.8 | 27.3 | 0.1 |
| 2010-9-1 08:00:06 | 27.4 | | -0.1 |
| 2010-9-1 08:00:08 | 27.5 | | 0.2 |
| 2010-9-1 08:00:10 | 28.1 | | 0 |
| 2010-9-1 08:00:12 | 28.0 | | -0.1 |
| 2010-9-1 08:00:14 | 27.7 | | 0 |
| 2010-9-1 08:00:16 | 27.4 | | 0.1 |
| 2010-9-1 08:00:18 | 27.3 | | 0 |

FIG. 2b

| Raw Data | Deviation Data | Interpolation Data | K1 | K2 | K3 |
|---|---|---|---|---|---|
| 26.1 | 0 | 26.1 | | | |
| 26.3 | 0.2 | 26.5 | −0.05 | 0.25 | 0.175 |
| 26.8 | 0.1 | 26.9 | 0.1 | 0.25 | 0.217 |
| 27.4 | −0.1 | 27.3 | 0.167 | 0.267 | 0.175 |
| 27.5 | 0.2 | 27.7 | 0.1375 | 0.2125 | 0.2 |
| 28.1 | 0 | 28.1 | 0.17 | 0.23 | 0.158 |
| 28 | −0.1 | 27.9 | −0.2 | 0.1 | −0.1 |
| 27.7 | 0 | 27.7 | −0.175 | −0.025 | −0.117 |
| 27.4 | 0.1 | 27.5 | −0.167 | −0.067 | −0.1 |
| 27.3 | 0 | 27.3 | −0.1375 | −0.0625 | |

DATA QUERY METHOD AND APPARATUS

CROSS-REFERENCE TO RELATED APPLICATIONS

This application is a continuation of International Application No. PCT/CN2015/098946, filed on Dec. 25, 2015, which claims priority to Chinese Patent Application No. 201510085627.6, filed on Feb. 16, 2015. The disclosures of the aforementioned applications are hereby incorporated by reference in their entireties.

TECHNICAL FIELD

The present application relates to the database field, and in particular, to a data query method and apparatus.

BACKGROUND

With development of life and production, a large amount of data needs to be stored and archived. Because a current database is capable of storing data of dozens to hundreds of TBs, the database plays a very important role in data storage and management.

The database stores a large amount of data. Therefore, to facilitate storage and reduce a query amount, in the prior art, the database tends to store the data in a partition according to time, a value range, or a hash value.

However, when querying data, a user may sometimes expect to obtain data of different precision according to different purposes. For example, to analyze a data change tendency, a user actually does not need each piece of data. Instead, the user expects more to obtain data that rapidly changes, or low-precision data by means of query. Data that changes slowly or has no change is of no obvious significance to tendency analysis. If a user queries data for a calculation or statistical purpose, the user expects to obtain high-precision data as much comprehensive as possible, so as to ensure that an error in a final calculation or statistical result is small if any.

However, because a database in the prior art performs storage in a partition according to time, a value range, or a hash value only, the database cannot meet query requirements of different precision.

SUMMARY

Embodiments of the present disclosure provide a data query method and apparatus, which can implement a purpose that data meeting a precision requirement is queried according to a user's requirement of for data precision.

A first aspect of the present application provides a data query method, including:
receiving a query instruction that includes a query condition and query precision;
determining a data partition that meets the query condition;
determining a data sub-partition corresponding to the query precision from the data partition; and
querying data in the data sub-partition to obtain a query result.

With reference to the first aspect, in a first possible implementation manner of the first aspect, the data sub-partition includes a high-precision sub-partition and a low-precision sub-partition, and the determining a data sub-partition corresponding to the query precision from the data partition specifically includes:

when the query precision is lower than or equal to precision of the low-precision sub-partition, determining that the low-precision sub-partition is the data sub-partition; or when the query precision is higher than precision of the low-precision sub-partition, determining that the high-precision sub-partition is the data sub-partition; or when the query precision is higher than precision of the low-precision sub-partition, determining that the low-precision sub-partition and the high-precision sub-partition are the data sub-partition.

With reference to the first aspect or the first possible implementation manner of the first aspect, in a second possible implementation manner of the first aspect, before the receiving a query instruction that includes a query condition and query precision, the method further includes:
receiving multiple pieces of raw data;
determining a partition corresponding to each piece of raw data according to a statistical parameter of the multiple pieces of raw data, where the partition includes the data partition;
classifying raw data in each partition into low-precision data and high-precision data; and
storing the low-precision data in each partition in a low-precision sub-partition of the corresponding partition, and storing the high-precision data in each partition in a high-precision sub-partition of the corresponding partition.

With reference to the second possible implementation manner of the first aspect, in a third possible implementation manner of the first aspect, the classifying raw data in each partition into low-precision data and high-precision data specifically includes:
performing a swinging door trending SDT compression algorithm on the raw data in each partition to obtain incompressible raw data;
using the incompressible raw data as the low-precision data; and
using the multiple pieces of raw data as the high-precision data; or
performing linear interpolation between all pieces of the incompressible raw data;
obtaining deviation data between each linear interpolant and corresponding raw data; and
using the deviation data as the high-precision data.

With reference to the third possible implementation manner of the first aspect, in a fourth possible implementation manner of the first aspect, when the deviation data is used as the high-precision data, and the low-precision sub-partition and the high-precision sub-partition are the data sub-partition, the querying data in the data sub-partition to obtain a query result specifically includes:
reading the incompressible raw data in the low-precision sub-partition;
performing linear interpolation between all pieces of the incompressible raw data;
reading the deviation data in the high-precision sub-partition;
obtaining raw data corresponding to the data partition according to each linear interpolant and the deviation data; and
using the raw data corresponding to the data partition as the query result.

With reference to the fourth possible implementation manner of the first aspect, in a fifth possible implementation manner of the first aspect, after the multiple pieces of raw data are obtained according to each linear interpolant and the deviation data, the method further includes:

determining, according to a filter condition further included in the query instruction and a statistical parameter of the raw data corresponding to the data partition, final data that meets the filter condition; and the using the raw data corresponding to the data partition as the query result is specifically:

using the final data as the query result.

With reference to the third possible implementation manner of the first aspect, in a sixth possible implementation manner of the first aspect, when the deviation data is used as the high-precision data, and the low-precision sub-partition and the high-precision sub-partition are the data sub-partition, the querying data in the data sub-partition to obtain a query result specifically includes:

reading the incompressible raw data in the low-precision sub-partition;

performing linear interpolation between all pieces of the incompressible raw data;

determining, according to a filter condition further included in the query instruction and a statistical parameter corresponding to the linear interpolation, a qualified linear interpolant that meets the filter condition;

reading the deviation data corresponding to the qualified linear interpolant in the high-precision sub-partition;

obtaining raw data according to each qualified linear interpolant and the deviation data; and using the raw data as the query result.

With reference to the sixth possible implementation manner of the first aspect, in a seventh possible implementation manner of the first aspect, after the raw data is obtained according to each linear interpolant and the deviation data, the method further includes:

determining, according to the filter condition and a statistical parameter of the raw data, final data that meets the filter condition; and the using the raw data as the query result is specifically: using the final data as the query result.

A second aspect of the present application provides a data query apparatus, including:

a first receiving unit, configured to receive a query instruction that includes a query condition and query precision;

a first determining unit, configured to determine a data partition that meets the query condition;

a second determining unit, configured to determine a data sub-partition corresponding to the query precision from the data partition; and a query unit, configured to query data in the data sub-partition to obtain a query result.

With reference to the second aspect, in a first possible implementation manner of the second aspect, the data sub-partition includes a high-precision sub-partition and a low-precision sub-partition, and the second determining unit is specifically configured to:

when the query precision is lower than or equal to precision of the low-precision sub-partition, determine that the low-precision sub-partition is the data sub-partition; or when the query precision is higher than precision of the low-precision sub-partition, determine that the high-precision sub-partition is the data sub-partition; or when the query precision is higher than precision of the low-precision sub-partition, determine that the low-precision sub-partition and the high-precision sub-partition are the data sub-partition.

With reference to the second aspect or the first possible implementation manner of the second aspect, in a second possible implementation manner of the second aspect, the apparatus further includes:

a second receiving unit, configured to: before the query instruction that includes a query condition and query precision is received, receive multiple pieces of raw data;

a third determining unit, configured to determine a partition corresponding to each piece of raw data according to a statistical parameter of the multiple pieces of raw data, where the partition includes the data partition; and a data processing unit, configured to: classify raw data in each partition into low-precision data and high-precision data; and store the low-precision data in each partition in a low-precision sub-partition of the corresponding partition, and store the high-precision data in each partition in a high-precision sub-partition of the corresponding partition.

With reference to the second possible implementation manner of the second aspect, in a third possible implementation manner of the second aspect, the data processing unit is specifically configured to:

perform a swinging door trending SDT compression algorithm on the raw data in each partition to obtain incompressible raw data;

use the incompressible raw data as the low-precision data; and use the multiple pieces of raw data as the high-precision data; or perform linear interpolation between all pieces of the incompressible raw data;

obtain deviation data between each linear interpolant and corresponding raw data; and use the deviation data as the high-precision data.

With reference to the third possible implementation manner of the second aspect, in a fourth possible implementation manner of the second aspect, when the deviation data is used as the high-precision data, and the low-precision sub-partition and the high-precision sub-partition are the data sub-partition, the query unit is specifically configured to:

read the incompressible raw data in the low-precision sub-partition;

perform linear interpolation between all pieces of the incompressible raw data;

read the deviation data in the high-precision sub-partition;

obtain raw data corresponding to the data partition according to each linear interpolant and the deviation data; and use the raw data corresponding to the data partition as the query result.

With reference to the fourth possible implementation manner of the second aspect, in a fifth possible implementation manner of the second aspect, the query unit is further configured to:

after the raw data corresponding to the data partition is obtained according to each linear interpolant and the deviation data, determine, according to a filter condition further included in the query instruction and a statistical parameter of the raw data corresponding to the data partition, final data that meets the filter condition; and use the final data as the query result.

With reference to the third possible implementation manner of the second aspect, in a sixth possible implementation manner of the second aspect, when the deviation data is used as the high-precision data, and the low-precision sub-partition and the high-precision sub-partition are the data sub-partition, the query unit is specifically configured to:

read the incompressible raw data in the low-precision sub-partition;

perform linear interpolation between all pieces of the incompressible raw data;

determine, according to a filter condition further included in the query instruction and a statistical parameter corresponding to the linear interpolation, a qualified linear interpolant that meets the filter condition;

read the deviation data corresponding to the qualified linear interpolant in the high-precision sub-partition;

obtain raw data according to each qualified linear interpolant and the deviation data; and use the raw data as the query result.

With reference to the sixth possible implementation manner of the second aspect, in a seventh possible implementation manner of the second aspect, the query unit is further configured to:

determine, according to the filter condition and a statistical parameter of the raw data, final data that meets the filter condition; and use the final data as the query result.

A third aspect of the present application provides a data query device, including:

a receiver, configured to receive a query instruction that includes a query condition and query precision; and a processor, configured to: determine a data partition that meets the query condition; determine a data sub-partition corresponding to the query precision from the data partition; and query data in the data sub-partition to obtain a query result.

With reference to the third aspect, in a first possible implementation manner of the third aspect, the data sub-partition includes a high-precision sub-partition, and a low-precision sub-partition, and the processor is specifically configured to:

when the query precision is lower than or equal to precision of the low-precision sub-partition, determine that the low-precision sub-partition is the data sub-partition; or when the query precision is higher than precision of the low-precision sub-partition, determine that the high-precision sub-partition is the data sub-partition; or when the query precision is higher than precision of the low-precision sub-partition, determine that the low-precision sub-partition and the high-precision sub-partition are the data sub-partition.

With reference to the third aspect or the first possible implementation manner of the third aspect, in a second possible implementation manner of the third aspect, the receiver is further configured to:

before the query instruction that includes a query condition and query precision is received, receive multiple pieces of raw data; and the processor is configured to:

determine a partition corresponding to each piece of raw data according to a statistical parameter of the multiple pieces of raw data, where the partition includes the data partition; classify raw data in each partition into low-precision data and high-precision data; and store the low-precision data in each partition in a low-precision sub-partition of the corresponding partition, and store the high-precision data in each partition in a high-precision sub-partition of the corresponding partition.

With reference to the second possible implementation manner of the third aspect, in a third possible implementation manner of the third aspect, the processor is specifically configured to:

perform a swinging door trending SDT compression algorithm on the raw data in each partition to obtain incompressible raw data; use the incompressible raw data as the low-precision data; and use the multiple pieces of raw data as the high-precision data; or perform linear interpolation between all pieces of the incompressible raw data; obtain deviation data between each linear interpolant and corresponding raw data; and use the deviation data as the high-precision data.

With reference to the third possible implementation manner of the third aspect, in a fourth possible implementation manner of the third aspect, when the deviation data is used as the high-precision data, and the low-precision sub-partition and the high-precision sub-partition are the data sub-partition, the processor is specifically configured to:

read the incompressible raw data in the low-precision sub-partition; perform linear interpolation between all pieces of the incompressible raw data; read the deviation data in the high-precision sub-partition; obtain raw data corresponding to the data partition according to each linear interpolant and the deviation data; and use the raw data corresponding to the data partition as the query result.

With reference to the fourth possible implementation manner of the third aspect, in a fifth possible implementation manner of the third aspect, the processor is further configured to:

after the raw data corresponding to the data partition is obtained according to each linear interpolant and the deviation data, determine, according to a filter condition further included in the query instruction and a statistical parameter of the raw data corresponding to the data partition, final data that meets the filter condition; and use the final data as the query result.

With reference to the third possible implementation manner of the third aspect, in a sixth possible implementation manner of the third aspect, when the deviation data is used as the high-precision data, and the low-precision sub-partition and the high-precision sub-partition are the data sub-partition, the processor is specifically configured to:

read the incompressible raw data in the low-precision sub-partition; perform linear interpolation between all pieces of the incompressible raw data; determine, according to a filter condition further included in the query instruction and a statistical parameter corresponding to the linear interpolation, a qualified linear interpolant that meets the filter condition; read the deviation data corresponding to the qualified linear interpolant in the high-precision sub-partition; obtain raw data according to each qualified linear interpolant and the deviation data; and use the raw data as the query result.

With reference to the sixth possible implementation manner of the third aspect, in a seventh possible implementation manner of the third aspect, the processor is further configured to:

after the raw data is obtained according to each linear interpolant and the deviation data, determine, according to the filter condition and a statistical parameter of the raw data, final data that meets the filter condition; and use the final data as the query result.

One or more technical solutions provided in the embodiments of the present disclosure have at least the following technical effects or advantages:

receiving a query instruction that includes a query condition and query precision; determining a data partition that meets the query condition; determining a data sub-partition corresponding to the query precision from the data partition; and querying data in the data sub-partition to obtain a query result. Therefore, in the technical solutions of the embodiments of the present disclosure, the data partition is first determined according to the query condition, the data sub-partition corresponding to the query precision is subsequently determined from the data partition according to the query precision, and finally, data is queried from the data sub-partition. This implements a technical effect that data is queried according to query precision to provide data that better meets user requirements.

BRIEF DESCRIPTION OF DRAWINGS

FIG. 1 is a flowchart of a data query method according to an embodiment of the present disclosure;

FIG. 2a and FIG. 2b are schematic diagrams of a low-precision sub-partition and a high-precision sub-partition according to an embodiment of the present disclosure;

DESCRIPTION OF EMBODIMENTS

Embodiments of the present disclosure provide a data query method and apparatus, which implement a technical effect that data meeting a precision requirement is queried according to a user's requirement of for data precision.

To resolve the foregoing technical problem, a solution idea provided in the present disclosure includes the following content:

receiving a query instruction that includes a query condition and query precision; determining a data partition that meets the query condition; determining a data sub-partition corresponding to the query precision from the data partition; and querying data in the data sub-partition to obtain a query result. Therefore, in the technical solutions of the embodiments of the present disclosure, the data partition is first determined according to the query condition, the data sub-partition corresponding to the query precision is subsequently determined from the data partition according to the query precision, and finally, data is queried from the data sub-partition. This implements a technical effect that data is queried according to query precision to provide data that better meets user requirements.

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

The term "and/or" in this specification describes only an association relationship for describing associated objects and represents that three relationships may exist. For example, A and/or B may represent the following three cases: Only A exists, both A and B exist, and only B exists.

In addition, the character "/" in this specification generally indicates an "or" relationship between the associated objects.

Figures 1, 2A:
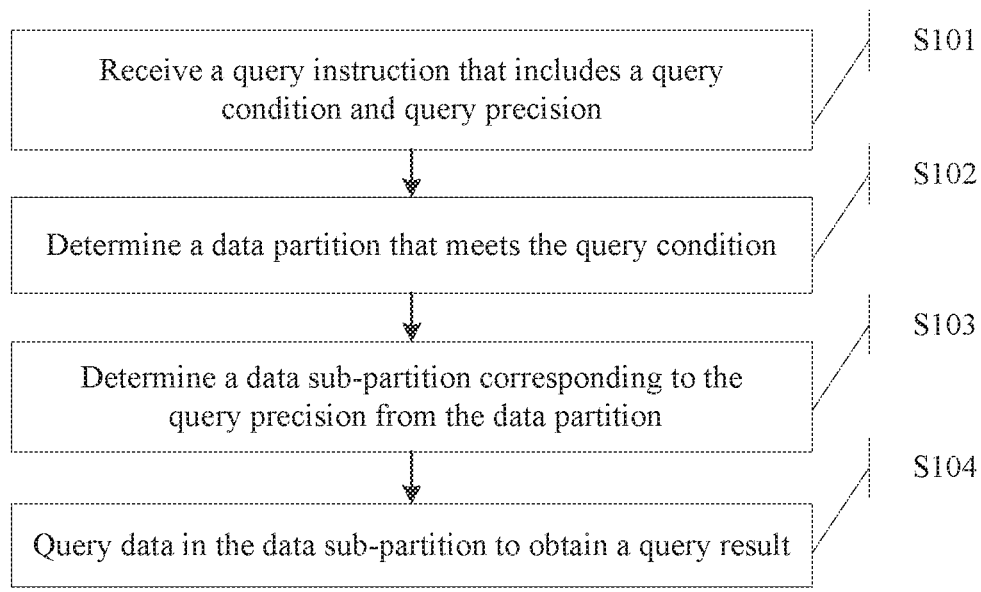

As shown in FIG. 1, a first aspect of the present application provides a data query method, including the following steps:

S101. Receive a query instruction that includes a query condition and query precision.

S102. Determine a data partition that meets the query condition.

S103. Determine a data sub-partition corresponding to the query precision from the data partition.

S104. Query data in the data sub-partition to obtain a query result.

First, in S101, the received query instruction includes the query condition and the query precision. Specifically, in this embodiment of the present disclosure, the query condition is corresponding to a statistical parameter of stored data. For example, a statistical parameter of data is time, such as 2010-1-1 to 2012-12-31. The query condition is also a time parameter, for example, the query condition is 2010-1-1, or 2010-1-1 to 2010-1-2.

Multiple pieces of data in a data query device are stored in a partition according to the statistical parameter. Therefore, the data partition that meets the query condition may be determined according to the query condition in the query instruction. For example, when the statistical parameter is time, and is specifically 2010-1-1 to 2012-12-31, data of one day is stored in one partition. Therefore, assuming that the query condition in the received query instruction is 2010-1-1, it is determined that a partition for storing data of that day, namely, 2010-1-1 is the data partition that meets the query condition.

Next, in S103, to obtain, by means of a query, data that meets the query precision, the data sub-partition corresponding to the query precision is further determined from the data partition. In a specific implementation process, the query precision may be the same as precision of the data sub-partition; or the query precision may be different from the precision of the data sub-partition, and the precision of the data sub-partition is higher than the query precision.

Specifically, the data sub-partition includes a high-precision sub-partition and a low-precision sub-partition. In this embodiment of the present disclosure, data precision of the high-precision sub-partition is 100%, and precision of the low-precision sub-partition is an arbitrary percentage lower than 100%. For ease of subsequent description, it is assumed that the precision of the low-precision sub-partition is q.

In this embodiment of the present disclosure, when the query precision is lower than or equal to q, it indicates that precision of data stored in the low-precision sub-partition may already meet a query precision requirement. Therefore, to accelerate a query speed, the low-precision sub-partition is determined as the data sub-partition.

When the query precision is higher than q, to meet a user's requirement for precision, a query may be performed only in the high-precision sub-partition, or a query may be performed in both the low-precision sub-partition and the high-precision sub-partition. That is, it is determined that the high-precision sub-partition is the data sub-partition, or both the low-precision sub-partition and the high-precision sub-partition are the data sub-partition. In a specific implementation process, a person of ordinary skill in the art of the present application may perform a selection according to an actual situation, which is not specifically limited in the present application.

Finally, in S104, the data sub-partition is queried to obtain the query result.

It can be seen from the foregoing description that, in the technical solution of this embodiment of the present disclosure, a query may be performed in different data sub-partitions according to query precision of a user, so as to meet user requirements in different query scenarios. In addition, when the query precision is lower than that of a low-precision sub-partition, a query is performed only in the low-precision sub-partition, which avoids querying all data, thereby improving query efficiency.

Optionally, before S101, the method further includes:
receiving multiple pieces of raw data;
determining a partition corresponding to each piece of raw data according to a statistical parameter of the multiple pieces of raw data, where the partition includes the data partition;
classifying raw data in each partition into low-precision data and high-precision data; and
storing the low-precision data in each partition in a low-precision sub-partition of the corresponding partition, and storing the high-precision data in each partition in a high-precision sub-partition of the corresponding partition.

Specifically, before data is queried, the data query device first needs to receive multiple pieces of raw data, for example, 10,000 pieces or 254,625 pieces. An amount of raw data is not specifically limited in the present application.

For ease of storage and queries, the data query device stores the multiple pieces of raw data in multiple partitions. Because statistics of raw data are collected according to a statistical parameter, a partition corresponding to each piece of raw data may be determined according to the statistical parameter. In S102, the determined data partition is also in the multiple partitions.

For example, the statistical parameter is time, and in the data query device, one partition is set to store data of one day. Therefore, a partition corresponding to raw data may be determined according to time of the raw data. For example, data of 2010-1-1 is corresponding to a first partition, and data of 2010-1-2 is corresponding to a second partition.

Further, for ease of querying data of different precision, the raw data in each partition further needs to be classified into the high-precision data and the low-precision data. In addition, the high-precision data in each partition is stored in a high-precision sub-partition of the corresponding partition, and the low-precision data in each partition is stored in a low-precision sub-partition of the corresponding partition.

Specifically, the raw data in each partition may be classified into the low-precision data and the high-precision data in multiple manners. For example, the raw data in the partition is decomposed into two groups by using a swinging door trending (SDT) compression algorithm, a wavelet algorithm, or the like. One group is the low-precision data, and the other group is the high-precision data. After the raw data is decomposed by using the SDT compression algorithm or the wavelet algorithm, a data amount of the obtained low-precision data is lower than a data amount of the high-precision data, for example, the high-precision data includes 100,000 pieces, but the low-precision data includes only 99 pieces.

In addition, a variance of each piece of raw data in the partition may also be calculated. Then, raw data with a variance higher than a threshold is used as the low-precision data, and raw data with a variance lower than the threshold is used as the high-precision data. When the raw data in the partition is classified into the low-precision data and the high-precision data, a person of ordinary skill in the art of the present application may perform a selection according to an actual situation, which is not specifically limited in the present application.

In the following, the SDT compression algorithm is used as an example to describe in detail a process of obtaining the low-precision data and the high-precision data, which is specifically as follows:

performing a swinging door trending SDT compression algorithm on the raw data in each partition to obtain incompressible raw data;
using the incompressible raw data as the low-precision data; and
using the multiple pieces of raw data as the high-precision data; or
performing linear interpolation between all pieces of the incompressible raw data;
obtaining deviation data between each linear interpolant and corresponding raw data; and
using the deviation data as the high-precision data.

It is assumed that the SDT compression algorithm of this round is performed starting from the $i^{th}$ piece of data in a partition. The SDT compression algorithm is specifically as follows.

Step 1: Use the $i^{th}$ piece of raw data as incompressible raw data.

Step 2: Make V2 equal to a value of the $(i+1)^{th}$ piece of raw data, V1 equal to a value of the $i^{th}$ piece of raw data, t2 equal to a statistical parameter of the $(i+1)^{th}$ piece of raw data, and t1 equal to a statistical parameter of the $i^{th}$ piece of raw data, and obtain a first slope K1 and a second slope K2 by using the formula 1 and the formula 2 by means of calculation:

$$K1=(V2-(V1+p))/(t2-t1) \qquad \text{formula 1}$$

$$K2=(V2-(V1-p))/(t2-t1) \qquad \text{formula 2, where}$$

p is a preset compression parameter.

Step 3: When K1 is not equal to K2, perform step 4; when K1 is equal to K2, end the SDT compression algorithm of this round.

Step 4: Make V3 equal to a value of the $(i+2)^{th}$ piece of raw data, V1 equal to the value of the $i^{th}$ piece raw data, t3 equal to a statistical parameter of the $(i+2)^{th}$ piece of raw data, and t1 equal to the statistical parameter of the $i^{th}$ piece of raw data, and obtain a third slope K3 by using the formula 3 by means of calculation.

$$K3=(V3-V1)/(t3-t1) \qquad \text{formula 3}$$

Step 5: When K3 is between K1 and K2, perform step 6; when K3 is not between K1 and K2, perform step 7.

Step 6: Determine the raw data from which a value of V2 is currently derived as compressible raw data; make V2 equal to a value of the first piece of raw data following the raw data from which the value of V2 is currently derived, make t2 equal to a statistical parameter of the first piece of raw data following the raw data from which a value of t2 is currently derived, keep values of V1 and t1 unchanged, and obtain the first slop K1 and the second slope K2 by using the formula 1 and the formula 2 by means of re-calculation; make V3 equal to a value of the first piece of raw data following the raw data from which a value of V3 is currently derived, make t3 equal to a statistical parameter of the first piece of raw data following the raw data from which a value of t3 is currently derived, keep the values of V1 and t1 unchanged, and obtain the third slope K3 by using the formula 3 by means of re-calculation; and perform step 5.

Step 7: Determine the raw data from which the value of V2 is currently derived as incompressible raw data, and use the raw data from which the value of V2 is currently derived as the first piece of raw data for the SDT compression algorithm of the next round; and end the SDT compression algorithm of this round.

In the foregoing algorithm, the preset compression parameter p is a parameter set by a user or a default parameter in the data query device, and may be set to a value such as 1, 0.1, or 0.5, which is not specifically limited in the present application.

For ease of description, reference may be made to FIG. 2a and FIG. 2b. It is assumed that raw data in a partition of 2010-9-1 is shown on the left side of FIG. 2a and FIG. 2b. Assuming that p=0.3, the first piece of raw data 26.1 is first used as incompressible raw data.

Next, V2 is made equal to 26.3, and V1 equal to 26.1. For ease of calculation, t1, t2, and t3 are all use a unit of seconds, and, t1=0, and t2=2. According to the formula 1 and formula 2, the following is obtained by means of calculation: K1=−0.05, and K2=0.25. Then, V3 is made equal to 26.8, V1 equal to 26.1, t1 equal to 0, and t3 equal to 4. According to the formula 3, the following is obtained by means of calculation: K3=0.175.

Because K3 is between K1 and K2, the second piece of raw data is compressible raw data.

Further, V2 is made equal to 26.8, V1 equal to 26.1, t2 equal to 4, and t1 equal to 0. According to the formula 1 and formula 2, the following is obtained by means of calculation: K1=0.1, and K2=0.25. V3 is made equal to 27.4, V1 equal to 26.1, t1 equal to 0, and t3 equal to 6. According to the formula 3, the following is obtained by means of calculation: K3=0.217.

Because K3 is between K1 and K2, the third piece of raw data is also compressible raw data.

According to a similar calculation process, it may be determined that the fourth piece of raw data and the fifth piece of raw data are also compressible raw data.

When it is determined whether the sixth piece of raw data is compressible raw data, V2 is made equal to 28.1, V1 equal to 26.1, t2 equal to 10, and t1 equal to 0. According to the formula 1 and formula 2, the following is obtained by means of re-calculation: K1=0.17, and K2=0.23. V3 is made equal to 28, V1 equal to 26.1, t1 equal to 0, and t3 equal to 12. According to the formula 3, the following is obtained by means of re-calculation: K3=0.158.

Because K3 is not between K1 and K2, the sixth piece of raw data is incompressible raw data, and the SDT compression algorithm of this round ends.

Because the data in the partition has not been completely decomposed, the SDT compression algorithm of the next round starts to be performed on subsequent data, and the sixth piece of raw data is used as the first piece of incompressible raw data in the SDT compression algorithm of the next round.

Next, V2 is made equal to 28, V1 equal to 28.1, t1 equal to 10, and t2 equal to 12. According to the formula 1 and formula 2, the following is obtained by means of calculation: K1=−0.2, and K2=0.1. Then, V3 is made equal to 27.7, V1 equal to 28.1, t1 equal to 10, and t3 equal to 14. According to the formula 3, the following is obtained by means of calculation: K3=−0.1.

Because K3 is between K1 and K2, the seventh piece of raw data is compressible raw data. A process of performing the SDT compression algorithm on subsequent raw data is similar. For each specific value obtained by means of calculation, reference may be made to FIG. 3, which is not listed one by one herein.

After the SDT compression algorithm has been performed on all of the 10 pieces of data in FIG. 2a and FIG. 2b, it may be learned that the first, sixth and tenth pieces of raw data are incompressible raw data, and the rest raw data is compressible raw data.

Next, the incompressible raw data is used as the low-precision data.

For the high-precision data, in this embodiment of the present disclosure, all raw data may be used as the high-precision data, as shown in FIG. 2a. Alternatively, to reduce a data amount of the high-precision data, the deviation data corresponding to the raw data may be used as the high-precision data.

Specifically, linear interpolation is first performed between all pieces of incompressible raw data. A specific implementation manner of linear interpolation in this embodiment of the present disclosure is similar to that in the prior art, and details are not described herein.

As shown in FIG. 2b, the first piece of raw data and the sixth piece of raw data are incompressible raw data, and linear interpolation is performed between the first piece of raw data and the sixth piece of raw data, so as to obtain linear interpolants between the first piece of raw data and the sixth piece of raw data, which are 26.1, 26.5, 26.9, 27.3, 27.7 and 28.1 in sequence. The first linear interpolant 26.1 and the sixth linear interpolant 28.1 are the two pieces of incompressible raw data.

Next, the deviation data between each linear interpolant and the corresponding raw data is obtained. The deviation data is obtained by, specifically, subtracting the raw data from the linear interpolant or subtracting the linear interpolant from the raw data, which is not limited in the present application. It is assumed that the deviation data is obtained by subtracting the raw data from the linear interpolant below. The example above is still used for description. The linear interpolants between the first piece of raw data and the sixth piece of raw data are 26.1, 26.5, 26.9, 27.3, 27.7 and 28.1 in sequence, and the linear interpolant 26.5 is corresponding to the second piece of raw data, so as to learn that a linear interpolant of the second piece of raw data is 0.2.

In this embodiment of the present disclosure, a linear interpolant of incompressible raw data is the incompressible raw data itself. Therefore, deviation data corresponding to the incompressible raw data is 0. However, data with deviation data being 0 may be corresponding to incompressible raw data, and may also be corresponding to compressible raw data.

After deviation data of all the raw data is obtained, the deviation data is used as the high-precision data. Finally, as shown in FIG. 2b, the incompressible raw data is used as the low-precision data, and is stored in the low-precision sub-partition, and the deviation data is used as the high-precision data, and is stored in the high-precision sub-partition.

Further, in this embodiment of the present disclosure, the precision of the low-precision sub-partition is as follows: q=(1−p/(max−min))×100%, where max is a maximum value of the raw data in the partition, and min is a minimum value. For example, in the partition shown in FIG. 2b, the maximum value max is 28.1, the minimum value min is 26.1, and p=0.3. Therefore, as shown in FIG. 2b, the precision q of the low-precision sub-partition is 85%.

In this embodiment of the present disclosure, as shown in FIG. 2a, when the raw data is used as the high-precision data, and the high-precision sub-partition is the data sub-partition, because data that is read is the raw data, the raw data that is read may be directly used as the query result.

When the deviation data is used as the high-precision data, and the low-precision sub-partition and the high-precision sub-partition are the data sub-partition, in this embodiment of the present disclosure, an implementation process of S104 specifically includes, but is not limited to the following two manners.

First Manner:

A specific implementation process of S104 includes:

reading the incompressible raw data in the low-precision sub-partition;

performing linear interpolation between all pieces of the incompressible raw data;

reading the deviation data in the high-precision sub-partition;

obtaining raw data corresponding to the data partition according to each linear interpolant and the deviation data; and using the raw data corresponding to the data partition as the query result.

Specifically, when it is determined that the low-precision sub-partition and the high-precision sub-partition are the data sub-partition, the incompressible raw data in the low-precision sub-partition is first read, and then linear interpolation is performed between all pieces of the incompressible raw data. Subsequently, the deviation data in the high-precision sub-partition is read. The raw data corresponding to the data partition is further restored according to the deviation data and the linear interpolant. Finally, the raw data is used as the query result.

The example above is still used for description. As shown in FIG. 2b, assuming that the query condition is 2010-9-1 and the query precision is 70%, the query precision is higher than precision of a low-precision sub-partition in the partition of 2014-9-1. Therefore, it is determined that the low-precision sub-partition and a high-precision sub-partition are the data sub-partition.

In a query, data in the low-precision sub-partition is queried first, and three pieces of incompressible raw data 26.1, 28.1, and 27.3 are obtained. Next, linear interpolation is performed between the three pieces of incompressible raw data, and 10 linear interpolants are obtained, which are 26.1, 26.5, 26.9, 27.3, 27.7, 28.1, 27.9, 27.7, 27.5 and 27.3 in sequence.

Subsequently, the deviation data in the high-precision sub-partition is further queried to obtain 0, 0.2, 0.1, −0.1, 0.2, 0, −0.1, 0, 0.1 and 0.

Next, raw data corresponding to the data partition is obtained according to the deviation data corresponding to each linear interpolant. A process of obtaining the raw data is specifically an inverse operation process of obtaining the deviation data. In this embodiment of the present disclosure, assuming that the deviation data is obtained by subtracting the raw data from the linear interpolant, the raw data is obtained by subtracting the deviation data from the linear interpolant. In the example shown in FIG. 2b, specifically, the deviation data 0 is corresponding to 26.1, 0.2 is corresponding to 26.5, 0.1 is corresponding to 26.9 . . . and 0 is corresponding to 27.3. The 10 pieces of raw data corresponding to the data partition are further obtained, which are 26.1, 26.3, 26.8, 27.4, 27.5, 28.1, 28, 27.7, 27.4 and 27.3 in sequence. Finally, the 10 pieces of raw data are used as the query result.

Optionally, after the raw data corresponding to the data partition is obtained, the method further includes:

determining, according to a filter condition further included in the query instruction and a statistical parameter of the raw data corresponding to the data partition, final data that meets the filter condition; and the using the raw data corresponding to the data partition as the query result is specifically:

using the final data as the query result.

Specifically, when the query instruction further includes a filter condition, to determine that the query result meets the filter condition, after the raw data is obtained, the raw data is filtered according to the filter condition, so as to determine the final data that meets the filter condition.

The example above is still used for description. It is assumed that the filter condition is [27, 28], that is, a value of the raw data needs to be greater than or equal to 27 and less than or equal to 28. After filtering, it is determined that 27.4, 27.5, 28.1, 28, 27.7, 27.4 and 27.3 in the raw data meet the filter condition. Therefore, the query result is 27.4, 27.5, 28.1, 28, 27.7, 27.4 and 27.3.

Second Manner:

In this embodiment of the present disclosure, the implementation process of S104 specifically includes:

reading the incompressible raw data in the low-precision sub-partition;

performing linear interpolation between all pieces of the incompressible raw data;

determining, according to a filter condition further included in the query instruction and a statistical parameter corresponding to the linear interpolation, a qualified linear interpolant that meets the filter condition;

reading the deviation data corresponding to the qualified linear interpolant in the high-precision sub-partition;

obtaining raw data according to each qualified linear interpolant and the deviation data; and using the raw data as the query result.

Specifically, the incompressible raw data in the low-precision sub-partition is first queried. Then, linear interpolation is performed between all pieces of the incompressible raw data. Subsequently, a linear interpolant is preliminarily filtered according to the filter condition in the query instruction, so as to determine the qualified linear interpolant that meets the filter condition. Further, the deviation data in the high-precision sub-partition is queried. However, because the linear interpolant has been preliminarily filtered, only the deviation data corresponding to the qualified linear interpolant needs to be queried when the high-precision sub-partition is queried. Subsequently, each piece of raw data is obtained with reference to the deviation data obtained by means of a query and the corresponding qualified linear interpolant. Finally, the raw data is used as the query result.

As shown in FIG. 2b, the example above is still used for description. The data in the low-precision sub-partition is first queried, to obtain three pieces of incompressible raw data: 26.1, 28.1, and 27.3. Next, linear interpolation is performed between the three pieces of incompressible raw data, and the 10 linear interpolants are obtained, which are 26.1, 26.5, 26.9, 27.3, 27.7, 28.1, 27.9, 27.7, 27.5 and 27.3 in sequence.

Assuming that the filter condition in the query instruction is [27.5, 28], qualified linear interpolants that meet the filter condition are 27.7, 27.9, 27.7 and 27.5.

In a specific implementation process, when the SDT compression algorithms performed, compression is performed according to the compression parameter. Therefore, an error p exists in the finally obtained low-precision data. That is, when a value of a linear interpolant is a, a value of actual data corresponding to the linear interpolant may fall within [a−p, a+p]. When [a−p, a+p] exists within a range of the filter condition, the linear interpolant shall be considered as a qualified linear interpolant.

For example, when the SDT compression algorithm is performed on data in the data partition shown in FIG. 2b, the decompression parameter p is 0.3. Therefore, actual values of the raw data corresponding to the foregoing 10 linear interpolants shall respectively fall within [25.1, 27.1], [25.5, 27.5], [25.9, 27.9], [26.3, 28.3], [26.7, 28.7], [27.1, 29.1], [26.9, 28.9], [26.7, 28.7], [26.5, 28.5], and [26.3, 28.3]. [25.5, 27.5], [25.9, 27.9], [26.3, 28.3], [26.7, 28.7], [27.1, 29.1], [26.9, 28.9], [26.7, 28.7], [26.5, 28.5], and [26.3, 28.3] all overlap with [27.5, 28]. Therefore, the linear interpolants 26.5, 26.9, 27.3, 27.7, 28.1, 27.9, 27.7, 27.5, and 27.3 may all serve as qualified linear interpolants. Finally, deviation data corresponding to 26.5, 26.9, 27.3, 27.7, 28.1, 27.9, 27.7, 27.5 and 27.3 is read from the high-precision sub-partition, that is, the deviation data corresponding to the second to tenth pieces of raw data is read, so as to obtain the second to tenth pieces of raw data with reference to the linear interpolants. A subsequent process of obtaining the raw data is similar to the first implementation manner, and details are not described herein.

Optionally, after the raw data is obtained according to each linear interpolant and the deviation data, the method further includes:

determining, according to the filter condition and a statistical parameter of the raw data, final data that meets the filter condition; and the using the raw data as the query result is specifically: using the final data as the query result.

Specifically, after the raw data is obtained, the raw data may be filtered again according to the filter condition, so that the query result better meets the filter condition.

The example above is still used for description. Assuming that the filter condition is [27.5, 28], in raw data 26.5, 26.8, 27.4, 27.5, 28.1, 28, 27.7, 27.4 and 27.3, 27.5, 28 and 27.7 are the final data that meets the filter condition. Therefore, the query result is 27.5, 28 and 27.7.

Figures 3, 4:
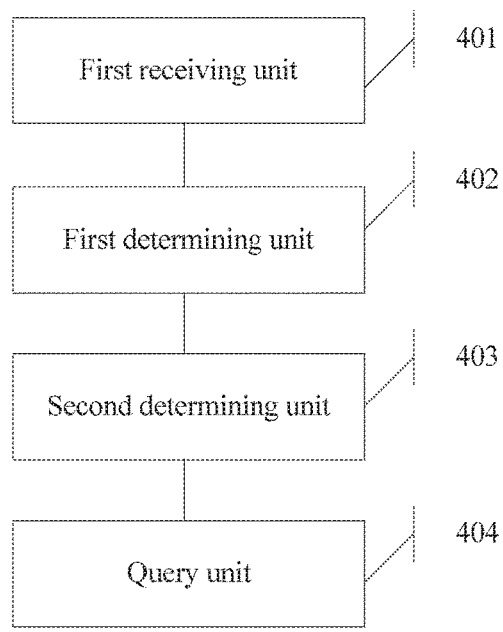
FIG. 3 is each calculated value obtained by performing an SDT compression algorithm on data in a partition according to an embodiment of the present disclosure.
FIG. 4 is a schematic structural diagram of a data query apparatus according to an embodiment of the present disclosure.

As shown in FIG. 4, an embodiment of the present application provides a data query apparatus, including:

a first receiving unit 401, configured to receive a query instruction that includes a query condition and query precision;

a first determining unit 402, configured to determine a data partition that meets the query condition;

a second determining unit 403, configured to determine a data sub-partition corresponding to the query precision from the data partition; and a query unit 404, configured to query data in the data sub-partition to obtain a query result.

Optionally, in an embodiment of the present disclosure, the data sub-partition includes a high-precision sub-partition and a low-precision sub-partition, and the second determining unit 403 is specifically configured to:

when the query precision is lower than or equal to precision of the low-precision sub-partition, determine that the low-precision sub-partition is the data sub-partition; or when the query precision is higher than precision of the low-precision sub-partition, determine that the high-precision sub-partition is the data sub-partition; or when the query precision is higher than precision of the low-precision sub-partition, determine that the low-precision sub-partition and the high-precision sub-partition are the data sub-partition.

Optionally, the apparatus in this embodiment of the present disclosure further includes:

a second receiving unit, configured to: before the query instruction that includes a query condition and query precision is received, receive multiple pieces of raw data;

a third determining unit, configured to determine a partition corresponding to each piece of raw data according to a statistical parameter of the multiple pieces of raw data, where the partition includes the data partition; and a data processing unit, configured to: classify raw data in each partition into low-precision data and high-precision data; and store the low-precision data in each partition in a low-precision sub-partition of the corresponding partition, and store the high-precision data in each partition in a high-precision sub-partition of the corresponding partition.

Optionally, the data processing unit is specifically configured to:

perform a swinging door trending SDT compression algorithm on the raw data in each partition to obtain incompressible raw data;

use the incompressible raw data as the low-precision data; and use the multiple pieces of raw data as the high-precision data; or perform linear interpolation between all pieces of the incompressible raw data;

obtain deviation data between each linear interpolant and corresponding raw data; and use the deviation data as the high-precision data.

Specifically, when the deviation data is used as the high-precision data, and the low-precision sub-partition and the high-precision sub-partition are the data sub-partition, the query unit 404 is specifically configured to:

read the incompressible raw data in the low-precision sub-partition;

perform linear interpolation between all pieces of the incompressible raw data;

read the deviation data in the high-precision sub-partition;

obtain raw data corresponding to the data partition according to each linear interpolant and the deviation data; and use the raw data corresponding to the data partition as the query result.

Optionally, the query unit 404 is further configured to:

after the raw data corresponding to the data partition is obtained according to each linear interpolant and the deviation data, determine, according to a filter condition further included in the query instruction and a statistical parameter of the raw data corresponding to the data partition, final data that meets the filter condition; and use the final data as the query result.

Specifically, when the deviation data is used as the high-precision data, and the low-precision sub-partition and the high-precision sub-partition are the data sub-partition, the query unit 404 is specifically configured to:

read the incompressible raw data in the low-precision sub-partition;

perform linear interpolation between all pieces of the incompressible raw data;

determine, according to a filter condition further included in the query instruction and a statistical parameter corresponding to the linear interpolation, a qualified linear interpolant that meets the filter condition;

read the deviation data corresponding to the qualified linear interpolant in the high-precision sub-partition;

obtain raw data according to each qualified linear interpolant and the deviation data; and use the raw data as the query result.

Optionally, the query unit 404 is further configured to:

determine, according to the filter condition and a statistical parameter of the raw data, final data that meets the filter condition; and use the final data as the query result.

An embodiment of the present application provides a data query device. For a meaning of a term and specific implementation that are related to a data query device shown in FIG. 5, reference may be made to the foregoing FIG. 1 to FIG. 4 and related description of the embodiment.

Figure 5:
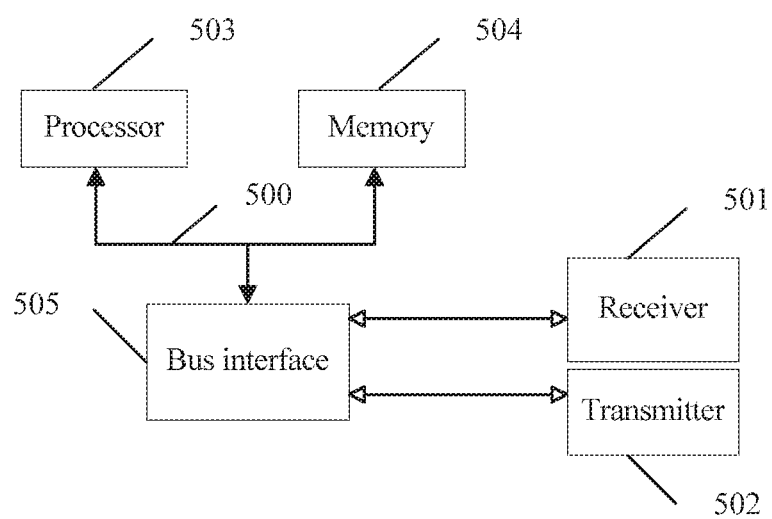
FIG. 5 is a schematic structural diagram of a data query device according to an embodiment of the present disclosure.

Referring to FIG. 5, the device includes:

a receiver 501, configured to receive a query instruction that includes a query condition and query precision;

a processor 503, configured to: determine a data partition that meets the query condition; determine a data sub-partition corresponding to the query precision from the data partition; and query data in the data sub-partition to obtain a query result.

Optionally, the data sub-partition includes a high-precision sub-partition, and a low-precision sub-partition, and the processor 503 is specifically configured to:

when the query precision is lower than or equal to precision of the low-precision sub-partition, determine that the low-precision sub-partition is the data sub-partition; or when the query precision is higher than precision of the low-precision sub-partition, determine that the high-precision sub-partition is the data sub-partition; or when the query precision is higher than precision of the low-precision sub-partition, determine that the low-precision sub-partition and the high-precision sub-partition are the data sub-partition.

Optionally, the receiver 501 is further configured to: before the query instruction that includes a query condition and query precision is received, receive multiple pieces of raw data; and the processor 503 is configured to:

determine a partition corresponding to each piece of raw data according to a statistical parameter of the multiple pieces of raw data, where the partition includes the data partition;

classify raw data in each partition into low-precision data and high-precision data; and store the low-precision data in each partition in a low-precision sub-partition of the corresponding partition, and store the high-precision data in each partition in a high-precision sub-partition of the corresponding partition.

Optionally, the processor 503 is specifically configured to:

perform a swinging door trending SDT compression algorithm on the raw data in each partition to obtain incompressible raw data;

use the incompressible raw data as the low-precision data; and use the multiple pieces of raw data as the high-precision data; or perform linear interpolation between all pieces of the incompressible raw data;

obtain deviation data between each linear interpolant and corresponding raw data; and use the deviation data as the high-precision data.

When the deviation data is used as the high-precision data, and the low-precision sub-partition and the high-precision sub-partition are the data sub-partition, the processor 503 is specifically configured to:

read the incompressible raw data in the low-precision sub-partition;

perform linear interpolation between all pieces of the incompressible raw data;

read the deviation data in the high-precision sub-partition;

obtain raw data corresponding to the data partition according to each linear interpolant and the deviation data; and use the raw data corresponding to the data partition as the query result.

Optionally, the processor 503 is further configured to:

after the multiple pieces of raw data are obtained according to each linear interpolant and the deviation data, determine, according to a filter condition further included in the query instruction and a statistical parameter of the multiple pieces of raw data, final data that meets the filter condition; and uses the final data as the query result.

Optionally, when the deviation data is used as the high-precision data, and the low-precision sub-partition and the high-precision sub-partition are the data sub-partition, the processor 503 is specifically configured to:

read the incompressible raw data in the low-precision sub-partition;

perform linear interpolation between all pieces of the incompressible raw data;

determine, according to a filter condition further included in the query instruction and a statistical parameter corresponding to the linear interpolation, a qualified linear interpolant that meets the filter condition;

read the deviation data corresponding to the qualified linear interpolant in the high-precision sub-partition;

obtain raw data according to each qualified linear interpolant and the deviation data; and use the raw data as the query result.

Optionally, the processor 503 is further configured to:

after the raw data is obtained according to each linear interpolant and the deviation data, determine, according to the filter condition and a statistical parameter of the raw data, final data that meets the filter condition; and uses the final data as the query result.

In FIG. 5, there is a bus architecture (represented by a bus 500). The bus 500 may include any quantity of interconnected buses and bridges. The bus 500 links together various circuits that include one or more processors represented by the processor 503 and a memory represented by a memory 504. The bus 500 may further link together various other circuits, such as a peripheral device, a voltage regulator, and a power management circuit. These are all well known in the art. Therefore, this specification provides no further description. A bus interface 505 provides interfaces between the bus 500 and the receiver 501 and a transmitter 502. The receiver 501 and the transmitter 502 may be a same component, that is, a transceiver, which provides a unit that is configured to communicate with various other apparatuses on a transmission medium.

The processor 503 is responsible for managing the bus 500 and general processing, and the memory 504 may be configured to store data used when the processor 503 performs an operation.

Various variation manners and specific instances of data queries described in the foregoing embodiments are also applicable to the data query device in this embodiment. With detailed description of the foregoing execution process of the data query method and the data query apparatus, a person skilled in the art may clearly understand an implementation manner of the data query device in this embodiment. Therefore, for brevity of the specification, details are not further described herein.

One or more technical solutions provided in the embodiments of the present disclosure have at least the following technical effects or advantages:

receiving a query instruction that includes a query condition and query precision; determining a data partition that meets the query condition; determining a data sub-partition corresponding to the query precision from the data partition; and querying data in the data sub-partition to obtain a query result. Therefore, in the technical solutions of the embodiments of the present disclosure, the data partition is first determined according to the query condition, the data sub-partition corresponding to the query precision is subsequently determined from the data partition according to the query precision, and finally, data is queried from the data sub-partition. This implements a technical effect that data is queried according to query precision to provide data that better meets user requirements.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Obviously, a person skilled in the art can make various modifications and variations to the present disclosure without departing from the scope of the present disclosure. The present disclosure is intended to cover these modifications and variations provided that they fall within the scope of protection defined by the following claims of the present disclosure and their equivalent technologies.

What is claimed is:

1. A data query method, comprising:
receiving, by a data query device, a query instruction comprising a query condition and query precision;
determining, by the data query device, a data partition that meets the query condition;
determining, by the data query device, a data sub-partition corresponding to the query precision from the data partition, wherein the data sub-partition comprises at least one of a high-precision sub-partition of the data partition or a low-precision sub-partition of the data partition, wherein determining the data sub-partition comprises:
when the query precision is lower than precision of the low-precision sub-partition, determining that the low-precision sub-partition is the data sub-partition; or
when the query precision is higher than precision of the low-precision sub-partition, determining that the high-precision sub-partition is the data sub-partition; or
when the query precision is higher than precision of the low-precision sub-partition, determining that the low-precision sub-partition and the high-precision sub-partition are the data sub-partition,
wherein a data amount of the low-precision sub-partition is lower than a data amount of the high-precision sub-partition, wherein the low-precision sub-partition is not a subset of the high-precision sub-partition; and
querying, by the data query device, data in the data sub-partition to obtain a query result.

2. The method according to claim 1, wherein before receiving a query instruction, the method further comprises:
receiving multiple pieces of raw data;
determining a partition corresponding to each piece of raw data according to a statistical parameter of the multiple pieces of raw data, wherein the partition comprises the data partition;
classifying raw data in each partition into low-precision data and high-precision data; and
storing the low-precision data in each partition in a low-precision sub-partition of the corresponding partition, and storing the high-precision data in each partition in a high-precision sub-partition of the corresponding partition.

3. The method according to claim 2, wherein classifying raw data in each partition into low-precision data and high-precision data comprises:
performing a swinging door trending (SDT) compression algorithm on the raw data in each partition to obtain incompressible raw data; and
using the incompressible raw data as the low-precision data.

4. The method according to claim 2, wherein classifying raw data in each partition into low-precision data and high-precision data comprises:
performing a swinging door trending (SDT) compression algorithm on the raw data in each partition to obtain incompressible raw data;
using the incompressible raw data as the low-precision data;
performing linear interpolation between all pieces of the incompressible raw data;
obtaining deviation data between each linear interpolant and corresponding raw data; and
using the deviation data as the high-precision data.

5. The method according to claim 4, wherein when the deviation data is used as the high-precision data, and the low-precision sub-partition and the high-precision sub-partition are the data sub-partition, querying data in the data sub-partition to obtain a query result comprises:

reading the incompressible raw data in the low-precision sub-partition;

performing linear interpolation between all pieces of the incompressible raw data;

reading the deviation data in the high-precision sub-partition;

obtaining raw data corresponding to the data partition according to each linear interpolant and the deviation data; and using the raw data corresponding to the data partition as the query result.

6. The method according to claim 5, wherein after obtaining the raw data according to each linear interpolant and the deviation data, the method further comprises:

determining, according to a filtering condition further comprised in the query instruction and a statistical parameter of the raw data corresponding to the data partition, final data that meets the filtering condition; and using the raw data corresponding to the data partition as the query result comprises:

using the final data as the query result.

7. The method according to claim 4, wherein when the deviation data is used as the high-precision data, and the low-precision sub-partition and the high-precision sub-partition are the data sub-partition, querying data in the data sub-partition to obtain a query result comprises:

reading the incompressible raw data in the low-precision sub-partition;

performing linear interpolation between all pieces of the incompressible raw data;

determining, according to a filter condition further comprised in the query instruction and a statistical parameter corresponding to the linear interpolation, a qualified linear interpolant that meets the filter condition;

reading the deviation data corresponding to the qualified linear interpolant in the high-precision sub-partition;

obtaining raw data according to each qualified linear interpolant and the deviation data; and using the raw data as the query result.

8. The method according to claim 7, wherein after obtaining raw data according to each qualified linear interpolant and the deviation data, the method further comprises:

determining, according to the filtering condition and a statistical parameter of the raw data, final data that meets the filtering condition; and using the raw data as the query result comprises:

using the final data as the query result.

9. The method according to claim 1, comprising:

maintaining, by the data query device, one or more data partitions, wherein each data partition of the one or more data partitions comprises a corresponding high-precision sub-partition and a corresponding low-precision sub-partition, wherein the corresponding high-precision sub-partition comprises all data of the corresponding low-precision sub-partition or comprises deviation data of all data of the corresponding low-precision sub-partition.

10. The method according to claim 1, comprising:

obtaining, by the data query device, a first set of raw data;

determining, by the data query device and from the first set of raw data, a first set of low-precision data, wherein the first set of low-precision data is a subset of the first set of raw data;

performing, by the data query device, linear interpolation between two data of the first set of low-precision data to generate a set of linear interpolants;

obtaining, by the data query device and based on the set of linear interpolants, a first set of deviation data;

storing, by the data query device, the first set of low-precision data in the low-precision sub-partition of the data partition; and storing, by the data query device, the first set of deviation data in the high-precision sub-partition of the data partition.

11. A data query apparatus, comprising:

at least one processor; and a non-transitory computer-readable storage medium coupled to the at least one processor and storing programming instructions for execution by the at least one processor, wherein the programming instructions instruct the at least one processor to:

receive a query instruction comprising a query condition and query precision;

determine a data partition that meets the query condition;

determine a data sub-partition corresponding to the query precision from the data partition, wherein the data sub-partition comprises at least one of a high-precision sub-partition of the data partition or a low-precision sub-partition of the data partition, wherein determining the data sub-partition comprises:

when the query precision is lower than precision of the low-precision sub-partition, determining that the low-precision sub-partition is the data sub-partition; or when the query precision is higher than precision of the low-precision sub-partition, determining that the high-precision sub-partition is the data sub-partition; or when the query precision is higher than precision of the low-precision sub-partition, determining that the low-precision sub-partition and the high-precision sub-partition are the data sub-partition, wherein a data amount of the low-precision sub-partition is lower than a data amount of the high-precision sub-partition, wherein the low-precision sub-partition is not a subset of the high-precision sub-partition; and query data in the data sub-partition to obtain a query result.

12. The apparatus according to claim 11, wherein the programming instructions instruct the at least one processor to:

before the query instruction is received, receive multiple pieces of raw data;

determine a partition corresponding to each piece of raw data according to a statistical parameter of the multiple pieces of raw data, where the partition includes the data partition;

classify raw data in each partition into low-precision data and high-precision data; and store the low-precision data in each partition in a low-precision sub-partition of the corresponding partition, and store the high-precision data in each partition in a high-precision sub-partition of the corresponding partition.

13. The apparatus according to claim 12, wherein the programming instructions instruct the at least one processor to:
perform a swinging door trending (SDT) compression algorithm on the raw data in each partition to obtain incompressible raw data; and
use the incompressible raw data as the low-precision data.

14. The apparatus according to claim 12, wherein the programming instructions instruct the at least one processor to:
perform a swinging door trending (SDT) compression algorithm on the raw data in each partition to obtain incompressible raw data;
use the incompressible raw data as the low-precision data;
perform linear interpolation between all pieces of the incompressible raw data;
obtain deviation data between each linear interpolant and corresponding raw data; and
use the deviation data as the high-precision data.

15. The apparatus according to claim 14, wherein when the deviation data is used as the high-precision data, and the low-precision sub-partition and the high-precision sub-partition are the data sub-partition, the programming instructions instruct the at least one processor to:
read the incompressible raw data in the low-precision sub-partition;
perform linear interpolation between all pieces of the incompressible raw data;
read the deviation data in the high-precision sub-partition;
obtain raw data corresponding to the data partition according to each linear interpolant and the deviation data; and
use the raw data corresponding to the data partition as the query result.

16. The apparatus according to claim 15, wherein the programming instructions instruct the at least one processor to:
after the raw data corresponding to the data partition is obtained according to each linear interpolant and the deviation data, determine, according to a filtering condition further comprised in the query instruction and a statistical parameter of the raw data corresponding to the data partition, final data that meets the filtering condition; and
use the final data as the query result.

17. The apparatus according to claim 14, wherein when the deviation data is used as the high-precision data, and the low-precision sub-partition and the high-precision sub-partition are the data sub-partition, the programming instructions instruct the at least one processor to:
read the incompressible raw data in the low-precision sub-partition;
perform linear interpolation between all pieces of the incompressible raw data;
determine, according to a filter condition further comprised in the query instruction and a statistical parameter corresponding to the linear interpolation, a qualified linear interpolant that meets the filter condition;
read the deviation data corresponding to the qualified linear interpolant in the high-precision sub-partition;
obtain raw data according to each qualified linear interpolant and the deviation data; and
use the raw data as the query result.

18. The apparatus according to claim 17, wherein the programming instructions instruct the at least one processor to:
determine, according to the filtering condition and a statistical parameter of the raw data, final data that meets the filtering condition; and
use the final data as the query result.

19. A non-transitory, computer-readable storage medium comprising instructions which, when executed by a computer, cause the computer to perform one or more operations, the one or more operations comprising:
receiving, by a data query device, a query instruction comprising a query condition and query precision;
determining, by the data query device, a data partition that meets the query condition;
determining, by the data query device, a data sub-partition corresponding to the query precision from the data partition, wherein the data sub-partition comprises at least one of a high-precision sub-partition of the data partition or a low-precision sub-partition of the data partition, wherein determining the data sub-partition comprises:
when the query precision is lower than precision of the low-precision sub-partition, determining that the low-precision sub-partition is the data sub-partition; or
when the query precision is higher than precision of the low-precision sub-partition, determining that the high-precision sub-partition is the data sub-partition; or
when the query precision is higher than precision of the low-precision sub-partition, determining that the low-precision sub-partition and the high-precision sub-partition are the data sub-partition,
wherein a data amount of the low-precision sub-partition is lower than a data amount of the high-precision sub-partition, wherein the low-precision sub-partition is not a subset of the high-precision sub-partition; and
querying, by the data query device, data in the data sub-partition to obtain a query result.

* * * * *